(12) United States Patent
Schuessler et al.

(10) Patent No.: US 7,441,706 B1
(45) Date of Patent: Oct. 28, 2008

(54) METHOD AND SYSTEM FOR PROCESSING AND USING INFORMATION

(75) Inventors: Frederick Schuessler, Baiting Hollow, NY (US); Joseph Katz, Stony Brook, NY (US); Robert Sanders, St. James, NY (US); Michael Poldino, Centerport, NY (US); Vincent P. Luciano, Port Jefferson Station, NY (US); Adam Petrovich, Pittsburgh, PA (US); Ron Goldman, Cold Spring Harbor, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 218 days.

(21) Appl. No.: 09/827,466

(22) Filed: Apr. 6, 2001

Related U.S. Application Data (63) Continuation-in-part of application No. 09/240,399, filed on Jan. 29, 1999, now Pat. No. 6,243,447.

(60) Provisional application No. 60/268,501, filed on Feb. 13, 2001, provisional application No. 60/260,549, filed on Jan. 8, 2001, provisional application No. 60/259,747, filed on Jan. 4, 2001, provisional application No. 60/256,266, filed on Dec. 18, 2000, provisional application No. 60/256,007, filed on Dec. 15, 2000, provisional application No. 60/239,678, filed on Oct. 12, 2000, provisional application No. 60/237,639, filed on Oct. 3, 2000, provisional application No. 60/195,839, filed on Apr. 11, 2000.

(51) Int. Cl.
*G06F 17/00* (2006.01)
*G06F 19/00* (2006.01)
*G06K 7/10* (2006.01)

(52) U.S. Cl. .............................. 235/462.15; 235/462.01
(58) Field of Classification Search ............ 235/462.01, 235/462.13, 462.25, 462.46, 462.45, 472.01, 235/472.02, 470, 462.15; 705/23
See application file for complete search history.

(56) References Cited

U.S. PATENT DOCUMENTS

| | | | | | |
|---|---|---|---|---|---|
| 4,418,277 | A | * | 11/1983 | Tremmel et al. | 235/472.02 |
| 4,780,588 | A | * | 10/1988 | Edamura | 235/462.01 |
| 4,806,743 | A | * | 2/1989 | Thenery | 235/462.45 |
| 5,640,193 | A | * | 6/1997 | Wellner | 725/100 |
| 5,905,248 | A | * | 5/1999 | Russell et al. | 235/472.01 |
| 5,905,251 | A | * | 5/1999 | Knowles | 235/472.01 |
| 5,913,210 | A | * | 6/1999 | Call | 705/23 |

(Continued)

FOREIGN PATENT DOCUMENTS

EP  1 047 004 A  10/2000

(Continued)

OTHER PUBLICATIONS

International European Search Report EP 01 12 6228 dated Jan. 15, 2004.

*Primary Examiner*—Jared J Fureman
(74) *Attorney, Agent, or Firm*—Fay Kaplun & Marcin, LLP (57) ABSTRACT

A method for processing information wherein information is received from a plurality of bar code scanners, preferably reading web codes, the source and destination information for the received information is determined and data from the received information is distributed to at least one destination identified by the destination information.

37 Claims, 5 Drawing Sheets

U.S. PATENT DOCUMENTS

| | | | |
|---|---|---|---|
| 5,918,211 A * | 6/1999 | Sloane | 705/16 |
| 5,933,829 A | 8/1999 | Durst et al. | 707/10 |
| 5,971,277 A * | 10/1999 | Cragun et al. | 235/462.01 |
| 5,979,753 A * | 11/1999 | Roslak | 235/462.01 |
| 5,979,762 A * | 11/1999 | Bianco | 235/462.01 |
| 5,992,752 A * | 11/1999 | Wilz et al. | 235/472.01 |
| 6,036,086 A * | 3/2000 | Sizer et al. | 235/472.02 |
| 6,070,793 A * | 6/2000 | Reichl et al. | 235/472.01 |
| 6,123,259 A * | 9/2000 | Ogasawara | 235/462.45 |
| 6,134,548 A * | 10/2000 | Gottsman et al. | 707/5 |
| 6,148,331 A | 11/2000 | Parry | 709/218 |
| 6,154,738 A * | 11/2000 | Call | 705/23 |
| 6,185,602 B1 * | 2/2001 | Bayrakeri | 709/204 |
| 6,199,048 B1 * | 3/2001 | Hudetz et al. | 705/23 |
| 6,202,933 B1 * | 3/2001 | Poore et al. | 235/493 |
| 6,491,217 B2 * | 12/2002 | Catan | 235/462.01 |
| 6,512,919 B2 * | 1/2003 | Ogasawara | 705/23 |
| 6,595,417 B2 * | 7/2003 | O'Hagan et al. | 235/383 |
| 6,641,037 B2 * | 11/2003 | Williams | 235/462.45 |
| 6,651,053 B1 * | 11/2003 | Rothschild | 707/3 |
| 6,675,203 B1 * | 1/2004 | Herrod et al. | 235/462.45 |
| 7,055,737 B1 * | 6/2004 | Tobin et al. | 235/375 |
| 7,143,055 B1 * | 11/2006 | Perkowski | 705/26 |
| 7,337,948 B2 * | 3/2008 | Melick et al. | 235/375 |
| 2003/0050854 A1 * | 3/2003 | Showghi et al. | 705/26 |
| 2003/0057284 A1 * | 3/2003 | Challa et al. | 235/462.46 |
| 2004/0019535 A1 * | 1/2004 | Perkowski | 705/27 |
| 2004/0046014 A1 * | 3/2004 | Russell et al. | 235/375 |
| 2004/0153378 A1 * | 8/2004 | Perkowski | 705/27 |

FOREIGN PATENT DOCUMENTS

| | | | |
|---|---|---|---|
| JP | 10-171758 A | * | 6/1998 |
| JP | 2000-47967 A | * | 2/2000 |
| WO | WO 98 03923 A | | 1/1998 |
| WO | WO 99/24926 A1 | * | 5/1999 |
| WO | WO 00 45302 A | | 8/2000 |

* cited by examiner

METHOD AND SYSTEM FOR PROCESSING AND USING INFORMATION

RELATED APPLICATIONS

This application claims the priority of provisional application Ser. No. 60/195,839 filed on Apr. 11, 2000.

This application is related to U.S. Applications Ser. Nos. 60/239,678 filed Oct. 12, 2000, 60/237,639 filed Oct. 3, 2000, 60/256,007 filed Dec. 15, 2000, 60/256,266 filed Dec. 18, 2000, 60/259,747 filed Jan. 4, 2001, 60/260,549 filed Jan. 8, 2001 and 60/268,501 filed Feb. 13, 2001, the disclosures of which are hereby incorporated by reference. This application is a continuation-in-part of application Ser. No. 09/240,399, filed Jan. 29, 1999, now U.S. Pat. No. 6,243,447 the disclosure of which is incorporated by reference.

BACKGROUND OF THE INVENTION

The present invention relates to a method and system for processing information and in particular information received from bar code scanners.

The present invention also relates to bar codes which are encoded with information corresponding to an externally assigned entity, preferably an Internet address. For the purposes of this disclosure, such a bar code is described as a web code.

Web codes are different from UPC codes, since web code goes to a particular website to get information, while scanning a UPC code could lead one to different websites.

Numerous people and businesses have recognized the benefit of today's information rich society and reap the benefit from the availability of such information and the wide reach of the information-starved consumer. Today, most companies disseminate information by advertising information source addresses and locations on the Internet or other network systems. Currently, a person seeking information from a particular information source or location is required to correctly identify the information source, memorialize it for later reference, and then recreate the information address on a PC and retrieve the desired information.

A common example of this is advertising of web-site address. A company will typically issue a print ad for a specific product for publication in print media. The advertisement will also include a reference to a web site. The web site is generally a company web site which includes a catalog section and/or service description. Once a consumer uses his personal computer at home or otherwise to obtain access to the Internet, the consumer must then recall the advertisement, look up the web address and navigate to the product specific location within the company's web site. This process is time consuming and subject to multiple errors by the consumer. In fact, since web addresses are quite often very long and cryptic, a single error in the "network path" to the company's web site will prevent the consumer from gaining access to the desired information about the product.

In order to correct some of these problems, prior art systems have suggested using bar codes to provide an error free method for storing a web address or product specific code. The consumer can then use a device to read the bar code and then, once the bar code reading device is coupled to a network enabled system, utilize the data retrieved from the bar code to go to connect to that web address or otherwise call a store to place an order. Such systems have not been commercially feasible. Incorporating web addresses of the information sources within bar codes presents problems from both the technical and practical perspectives. First, some web addresses may be too long to be coded within a bar code scheme that has a predetermined maximum length. Second, placing a long bar code within print media is aesthetically unappealing. Third, since the web addresses are often subject to change (i.e. companies develop new web sites, or move existing sites to another location on the web), a change to the web address requires modification of the bar code on printed media. Furthermore, the products or publications with old web addresses incorporated in the bar codes will have incorrect information, which may discourage consumers from ever seeking to obtain information from a particular information source. Another problem with these systems described in the prior art is that consumers are required to purchase, carry and learn to use a bar code reader, a PC or modem device, and have sufficient knowledge and ability to use web browser and data transfer software that downloads data from the bar code reading device to the PC or network enabled device.

Other major problems that plague most currently used systems are cost inefficiency and limitations on the scope of provided information. In order to provide a simple and reliable system and obtain consumer acceptance, companies that have sought to utilize bar code systems direct customers and consumers to a specific address (i.e. a particular web site) having specific information about the product. Furthermore, to provide information services to their customers and consumers, these companies provide single application devices. Utilization of single application devices limits consumer usage and precludes competing companies from exploiting the company's investment in hardware, software and cost of information gathering, even though the benefits from the use of this system are given to the consumers for free or at some discount.

Other prior art systems propose the use of "license plate" numbers, which utilize a generic or pre-existing product identifier that is encoded in the form of a bar code. These systems also suffer from the similar problems and shortcomings as those that are previously described. As with other single application systems, the hardware that is utilized to support the information system is company specific, thereby forcing either the company or the consumer to absorb the entire cost of purchasing, installation and maintenance of the hardware. In addition, all these prior art systems require that the company maintain a database discriminator to identify the bar codes and associate them with the corresponding web locations.

The hardware that is used to read bar codes and employed in information systems to date is relatively complex and complicated in its operation and use. The complexity of the bar code hardware and other above-mentioned limitations of the prior art systems that utilize this hardware interfere and quite often prevent wide scale distribution and acceptance of the products.

SUMMARY OF THE INVENTION

In order to overcome the above-mentioned shortcomings and limitations of the prior art systems, it is the object of the present invention to provide an error-free, convenient and economical system and method of use, which would permit consumers to access information at the remote locations using inexpensive computerized resources and systems that are widely accepted by consumers.

Another object of the present invention is to provide a method and system for processing information, in particular, bar coded information, where the information is received from a plurality of bar code scanners, determining source and destination information for the received information and distributing data from the received information to at least one destination identified by the destination information.

It is a further object of the present invention to provide a system which may be employed by companies to distribute error free bar-coded identifiers, which enable consumers to use pre-existing bar code readers and systems to access information, purchase items and obtain service and warranty data.

It is still further object of the present invention to provide a system and method for accessing information resources related to consumer products, that incorporates the following:

a) a low cost and easy to use consumer devices;

b) a database management system for providing access to information by consumers and information management solution to companies;

c) an intermediate service provider to enable wide distribution of bar code equipment, to provide access to a known consumer base in specified areas during predetermined time periods; and d) a database management system for data mining, coupon issuance, predicative behavior suggestion and marketing.

In accordance with the present invention, the system operation and method of the present invention is carried out by a portal, which has an interface that receives scanner information from a plurality of devices having bar code scanners either by wireless communication, over some networks, via the Internet or by other similar transfer means, where the portal is also capable of transmitting information to the devices or to systems coupled to such devices. The portal also includes a subscriber interface which interfaces with subscribers either via the Internet or through other network communications, and which receives information from the subscribers for passing along to the users of the devices. The portal further comprises a processor that operates or supports operation of a server, controlling the flow of information and accessing a database wherein source and destination information can be looked up based on the information received from the scanner interface.

In accordance with the one system and method of the present invention, the portal itself maintains a database of bar codes, where each of those bar codes is a unique bar code that is assigned or associated with a particular subscriber. The database may also contain some additional information about each subscriber. Once the bar code that is printed in various media such as newspapers, catalogues, products and the like, is scanned by the bar code scanning device, it is transmitted to the processor, which looks it up in the database and determines the destination of the information, enabling the processor to communicate information to the subscriber via the subscriber interface.

In another embodiment, each scanner is assigned a user identification code, which is transmitted along with scanned bar codes through the scanner interface to processor. The database includes the user identification information along with the user identification number, and this information can then be used to determine the source information and, in some cases, the destination information for information being read by the bar code scanner. The bar codes can be assigned for a limited period of time, so that the bar code numbers themselves are reusable for new customers.

In a further embodiment of the present invention, after the bar code is assigned to a subscriber, the processor can communicate via the subscriber interface to provide an image file of the bar code, so that the bar code can be printed by the user in its final form for use in media and the like.

In a still another embodiment of the present invention, each user has a user identification number which is input via the bar code scanner, for example, by reading a particular bar code assigned to the user. This information is then communicated via the scanner interface to the processor, which supports a database that maintains the user identification information for that user number, allowing the processor to determine the correct source and destination information.

In another embodiment of the system and method of the present invention, users scan bar codes and this scanned information is collected in a batch form, that is, it is not communicated to the scanner interface until the end of a given period, for example, at the end of the day. The batch information is then sent to the scanner interface and processed by the processor, which determines and stores the source and destination information for each piece of information in the batch. Thereafter, when the processor receives information from the subscribers, it determines and directs transfer of the subscriber information through the scanner interface to the appropriate scanner user that submitted corresponding information in the batch of information that was initially communicated.

The processor also has the ability to decrypt information received via the scanner interface. Thus, in another embodiment of the present invention, each of the scanners, after reading information, encrypts that information, which is then communicated to the scanner interface. The processor decrypts that information and sends the decrypted information to the subscriber identified by the destination information therein.

In yet another embodiment of the present invention, the bar codes that are being read by the scanners have the destination information therein. For example, this is particularly useful with a two dimensional bar code, which can store a great deal of information, including, but not limited to, the specific identifier of the destination for the information to be passed along. For example, in one embodiment of the present invention, the scanner is installed into a cellular telephone, which transmits, along with the information relating to the red bar code, the time and date of the scanning of the bar code, as well as the location of the user at the time that the bar code is scanned. This information can then be processed and sent to the subscriber as part of the information relating to the user.

In accordance with the system and method of the present invention, the portal administrator can provide scanners to users, and charge subscribers a fee for routing information to the subscribers by the scanner users. The portal administrator can additionally charge a fee for assigning bar codes which have destination information therein. Additionally, the portal administrator can provide a web site in conjunction with the portal. When information is sent to users, it can be accessed at the web site. The portal administrator can also sell advertising on the web site.

Further in accordance with the system and method of the present invention, the portal can mine data that is obtained and is put into the database. The portal administrator can charge for information that is obtained from that database.

The system and method according to the present invention will allow users to read unique codes, to enable the users to find out more information about a product bearing the code, about a product being advertised in a newspaper or magazine, or about a product that is shown in a catalogue with the appropriate bar codes. The system can also provide the user of the scanner with competitive pricing information in the area, or inform about locations where a particular product can be purchased.

The bar codes that are provided may be either "license plates", which identify the subscriber, or may have a URL encoded therein, which identifies the destination of the subscriber, or may have a substantial amount of additional information encoded therein, as, for example, with a two dimensional bar code. For instance, the bar code may be a license plate and also encode specific destination information of the subscriber.

The portal can support and act in several modes of operations. In a transparent mode, the user reads a bar code and is directly connected to the subscriber via the portal. Alternatively, in a non-transparent mode, the user, after scanning a bar code, is directed to the portal and obtains the subscriber information from the portal web site, which receives the subscriber information and matches it to the user.

The present invention is also related to methods of use for web codes which can be read by any conventional barcode reader, such as a wand reader, a laser scanner, a CCD reader or the like, and provide access to an Internet network. The preferred reader is a cell phone with a scanner that can transmit the web code to a web portal. Specifically, these applications relate to wireless LAN environments that have Internet connectivity.

In one embodiment, web codes are scanned on lottery tickets and the user can then obtain an immediate response from a website telling the user whether he or she has won or lost. Alternatively, one can scan the barcode on a lottery ticket and obtain extended gaming, wherein certain lottery activities would take place so that there is time before the outcome is delivered to the user.

In another embodiment, the web codes and wireless scanner cellular phones are used with newspapers, and in particular, certain sections of the newspaper.

One can use it with the chess section, wherein you scan the web code, it connects you to a site where you then can either have a chess program downloaded to your computer or you can play a chess game on the computer with someone or a machine at the website. Alternatively, you could play out the game that is being highlighted in the chess section of the newspaper.

Similarly, one could have a web code in the bridge section of the newspaper. Scanning the code would allow you to play out the game as reported on your machine and perhaps have other interface relating to the bidding of the hand, etc.

One could scan web code listings in the newspapers relating to different athletes or allow you to scan a web code on baseball cards to get the immediate player stats for fantasy baseball or the like.

One could also scan the web code next to a sports picture and get the video clip of that picture. This could be done with any picture in a newspaper, even out side the sport section, to get a video clip.

The web code can be used with cartoons or comics. The user scans the web code in the phone and gets more of the cartoon. One could scan the web code next to a joke and get the punch line, or one could scan the web code near a trivia question and get an answer.

Web codes can also be used with classified ads. A web code next to a real estate classified ad could allow the user to obtain a virtual tour or inspection of the property offered for sale.

One could scan advertisements for magazines, scan the web code and obtain a sample of the magazine, such as one story or pictures from the magazine.

Web codes in newspapers can be used to allow the user to determine delivery dates or stop dates for delivery of the newspaper. A newspaper can have web codes that, if scanned by a user, would allow the user to buy a lottery ticket and have the cost of the ticket deducted from the user's account, such as charging it to a cell phone bill.

In another embodiment, one could update one's checkbook by scanning a web code on a receipt, so that it can deduct it from the checkbook in one's checking account program on the Internet.

Another use for the web code includes putting a web code on a wall to view graffiti or art.

One can have a web code associated with a magazine article, and one can scan the web code and hear the article reproduced by audio. Alternatively, one can scan a web code on associated media and obtain a different multimedia version of the associated media. Thus, for example, a video instead of a static graphic, video versus audio, print versus audio, print versus video, one language versus a different language. One could associate a web code associated with any print material to get a picture relating to that print or text. One could scan a web code with a movie ad and get the trailer. One could scan a web code with an advertisement for a book and get the first chapter. Web codes could be associated with textbooks, so that scanning the web code at the end of a chapter will obtain answers to questions and scanning a web code could also obtain explanations of the answers.

Web codes can be provided for security guards for obtaining information relating to buildings or other facilities being watched.

A method and system of the present invention allows for real time responses, so that one could submit the answer to a question or series of questions using web codes associated with those questions, and one could obtain the status of your score relative to others who are answering the same questions.

Web codes could be used with newspapers or other print media to allow readers to play "So You Want To Be A Millionaire". They could scan a web code and present an answer within a given time period, for example, one minute.

Another embodiment is the use of web codes with products, and the web code can be scanned to obtain an instruction manual for the product. Alternatively, the code can be scanned to get warranty registration or warranty information. A web code can be used for the remote control of a VCR.

Web codes can be used to order food from a menu in a restaurant. One could scan a code and it would explain what the dish is, it could show a picture of the dish, or one can order by scanning the item on the menu and scanning a code corresponding to the table. A WAN to WAN connectivity can be used so that no infrastructure is needed in the restaurant. One could also scan a discount card and the bill from the restaurant, so one could obtain a discount on the meal from the club or whatever group the user belongs to. One can also scan a menu for food delivery.

The placing of web codes on business cards could be used to indicate directions via GPS to the destination indicated on the business card. Moreover, verbal directions could be given, particularly in view of the fact that the scanner's position would be known. This would use GPS along with the scanner and the cell phone.

The business card web code could also be used to indicate to the person scanning the types of transportation available at the address, the hotels at the address, restaurants, etc.

In a further embodiment, one can link personal data with the scanner, so that information retrieved based on the scanning of a web code would be based on the personal information. This could either be device specific personal information or user specific personal information. For example, one can use a web code on a police sticker or a fire sticker that one puts in one's home. Scanning the web code on the stickers would enable the homeowner to get connected, and the homeowner's address and telephone number and other important information, for example, the nearness of a hydrant or other personal information, would be indicated.

One could also have an emergency sticker with a web code in the car. Scanning this web code would dial 911 and give the police the name and identity of the car and car owner and perhaps the location of the car.

In another embodiment, one can use a precode on the web code which would be tied to what the code should be used for. For example, one precode would indicate that the code is a telephone number which would be programmed to have the phone call the number and send information. Preferably, the reader would have a preprocessor to handle this precode.

In the situation where the output of the scanner is encrypted and must go to a website, a particular prefix on a web code can be used to turn off the encryption, so that it would be indicating to the device that this code is intended to be read locally.

The web codes can be used with all manners of materials. Voting materials would have web codes, so that the user could scan the code and find out information about the candidate and perhaps the be directed to the candidate's website.

A web code on a map would be used to obtain a different version that is dynamically changed for a user. For example, depending upon the time of day, day of the week, or depending upon real time information, such as an accident or a road closure for other reasons, the map would dynamically change and give a alternate route to the user based upon the real time information.

A commuter time table with web codes to enable the user to scan the time table and find out real time information about the train, such as whether it is on time, the track and perhaps other trains that leave before and after it.

Web codes could also be scanned for parking situations. One could have a parking sign with the web code, which when scanned, would tell you the regulations regarding parking for that particular day, the rate of parking and any other special information which is up to the minute, such as cancellation of alternate side of the street parking, etc. Scanning the barcode and perhaps scanning a car code would enable the cost of the parking to be charged to the user's cell phone account.

In another example, a parking area has web codes to be scanned at the time of entry, and one is informed of the parking spot that one has been assigned and for the time period for which one can park there. Moreover, the charges for parking for that time period will be billed to one's cell phone account.

With regard to a restaurant, one could scan web codes to preload an order and to indicate when one would come back to pick it up. The user could also load in coupons by scanning them, so that the final bill would take into account the coupons.

In a further example, one could scan a web code on the seat that one is sitting in at a sporting event or a theater and scan web codes on a menu and have a person come with the food to one's seat when the food is ready.

Web codes could also be used for window shopping. One would scan the code in the window and get information about the product.

A further use of web codes is with airline tickets. For example, an American Airlines ticket would have a web code on it which the user could scan to find out if the flight is on time and any other real time information regarding the flight. One could also find out the seating assignment, the size of the plane, and any other up to date information.

Regarding airline tickets and other activities requiring a waiting list, one could have an update as to where one is on a waiting list by scanning a web code on a receipt.

One object of the invention for using web codes is the scanning of web codes by a cell phone scanner to provide a user with real time updates in almost any situation.

In another embodiment, two items, each having a web code, could be scanned so that the items are matched.

In a further embodiment web codes are used on coupons. A person could receive a coupon at home for Burger King or McDonald's. The person would then go to the restaurant, scan the code, and the restaurant could then check the customer's profile and suggest a menu based upon prior shopping behavior.

Web codes can also be used for completing transactions. A web code is placed on the scanning device cell phone itself. One could then scan a web code for a particular product, for example, at a retailer, and then the retailer would scan the web code on the user's device which would include credit card information and any other personal information need to complete the transaction.

Another example is to have web codes on clothes. In this way, if one went to a retailer, the retailer could scan the web codes on one's clothes and look up in a database relating to the customer what other clothes he has or what his preferences are for colors and be able to match to the clothes that he has or to fill in what he doesn't have.

In a further embodiment, web codes can be used for catalog ordering. A catalog would have a web code for each item and a set of secondary bar codes or web codes for color, size, style, etc. The secondary codes would be either on the back page of the catalog or on a foldout page which can be accessed when the user is on any page of the catalog. The method would preferably require that the cell phone scanner indicate to the user that it needs more information than the originally scanned web code for the item. This can be done by beeping and having some text prompt that asks for one to scan the next barcode in order to input color, size, etc. Alternatively, LED's, LCD's or some other kind of display would prompt the user to scan more barcodes.

For example, for color, the display would prompt one to scan "a" for red, "b" for white, "c" for black, etc. There would be a generic scan code for a, b, c, d and e. For an other item, it may say scan "a" for brown and "b" for blue. Thus, it would be the combination of the scanning of the first code and the scanning of the second code that would define the specific information for each item. One would only need to provide a, b, c, d, e scan codes and/or 1, 2, 3 scan codes, so as to be able to batch load all of the information needed for any particular item, and this would cut down on the number of codes necessary for each catalog entry. The system could also be used to give one up to date information as to whether the item one is ordering is in stock or if it is on backorder. Moreover, the personal information that can be sent to the catalog retailer might be able to lookup the information about the customer in a database to see whether the customer should get a discount on the items or one free item for being a good customer, or perhaps a prize for being a good customer. The system could also anticipate sizes, colors, etc. for the customer to cut down on the amount of information that the customer has to enter.

The web codes could also be used with the return process. A package would arrive with a web code for the package which would be scanned to return an item. The scanning of that web code could instruct UPS to pick the parcel up at the house of the device user. The device user could also select a time, and date, or may scan a code to request that a new or different size article be sent in place of the one being returned. The system could also do a real time authorization, that is, to make sure that the item is being returned within the proper time for obtaining a refund, or if it is outside that time, only for a store credit.

One object of the invention is to use a web code and a cell phone scanner combination to put an updated real time consumer oriented database at the disposal of the user.

Web codes can also be used for encoding a telephone number, and the reader needs to know if the web code contains a URL or a telephone number. In one embodiment, an intermediate step relating to privacy and/or security, for example, is provided, asking the user if he or she really wants to dial this telephone number. As an added security measure, one would scan a PDF bar code on a card to identify the user before dialing the telephone number or going to a particular URL. Alternatively, a fingerprint reader can be provided in a scan button or one could use other biometrics for security purposes, for example, voice recognition when the scan appliance includes a cellular phone.

The system could also be used to notify parents in real-time of credit card use by children and request approval. The system could also provide a profile of use to obtain pre-approval.

In another embodiment, a registry of applets can be provided on the web and web codes would be used to call out the desired applet.

Web codes can also be used with trial versions of products, such as music, video, games, toys, books, etc. In accordance with this embodiment, one would scan a web code in order to obtain a trial sample of the product and if the user liked the sample, one could scan another web code to buy the rest of it.

Another use of web codes is for multiple groups collaborating. One could scan a web code to arrange a preassigned meeting, for example, the web code to take one to a particular web page and provide one with an entry code to collaborate on that web page with others in the group.

One could sell blocks of web codes to retailers to use on receipts in order to take them or the purchaser to a database to find out information about the last purchase. Alternatively, one could incentivise people to purchase products that they put into their "cart", but they don't actually buy. The system would then offer discounts, etc., when someone took the product out of their cart. One can assign a predetermined range of web codes for parental control, and the control can be in the code or in the server. If in the code, then certain prefixes, etc., would be blocked, or the server would have a database of blocked codes.

Also for group meetings, one could use the web code to take potential meeting participant to a URL with the agenda. Alternatively, one could scan a code for a meeting, then scan another code for the time of the meeting, and then scan another code that directed it to a particular group of participants.

A web code could be on a business card to take one to a public calendar on a portal such as Yahoo.

The reader could also cache the last web code scanned or scan a code to save a particular web code number, i.e., by adding it to a favorites list or bookmarking it. A web code could be used to synchronize a PDA to a desktop, for example, for AvantGo.

A PDA could also be used to beam a web code. A web code could be used to send data to what is commonly known as web drives or side loading information into such a web drive. Then a web code could be scanned to synch the web drive to the hard drive of a computer.

One can also cross-sell web codes, that is, when a portal or website provider sets up a website for a user, the user automatically gets a web code to put on one's business card. This would be value added for the ISP. One could also put the web code on stationary, etc.

A web code can also be used to provide a profile and concatenate this to a warranty input. One could synch to the profile of choice. One would scan a bar code and send a profile to a person based on the scanning of a web code as the receiving address. One could selectively opt in by sending a profile by using a web code as an enabling code or one code associated with a group of websites. This is a dynamically opting in by reading a web code.

It is understood that in addition to the use of web codes, one can put this information on using magnetic stripes which encode the web code information. Alternatively, voice inputs into a phone using voice recognition for certification and the encryption of phone signals can be used to talk in a web code. One could also use the keypad to input the web code information.

These and other features and objects of the present invention will become more apparent from the following detailed description of the present invention and in reference to the attached drawings, wherein;

DETAILED DESCRIPTION OF THE INVENTION

Figure 1:
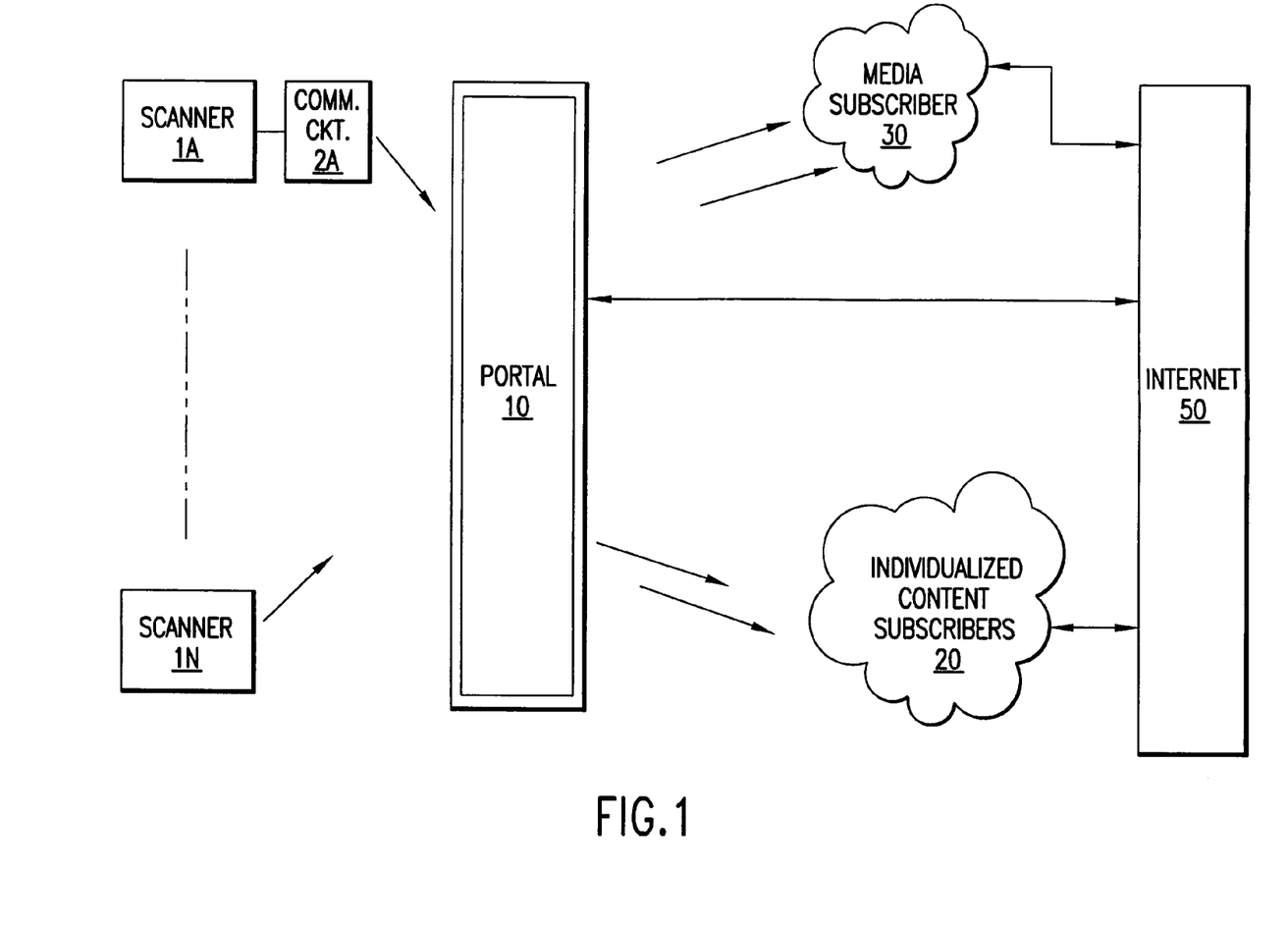
FIG. 1 is a schematic of the system according to the present invention for carrying out the method of the present invention.

Referring now to FIG. 1, the system according to the present invention is shown. A plurality of scanners 1A-1N are, as described above, either stand-alone scanners or scanners which are incorporated into other devices. The scanners can have a built-in communication circuitry or can have separate communication circuit, such as communication circuit 2A, which enable the scanners to send information to the portal 10 and receive information from the portal, as described hereinafter. The scanners can communicate with the portal through the POTS, cellular telephone network, cable TV network, etc.

The portal 10 communicates either directly to individual content subscribers 20 or media subscribers 30, or can interface with those subscribers via the Internet 50. The structure of the portal is shown in more detail in FIG. 2.

Figure 2:
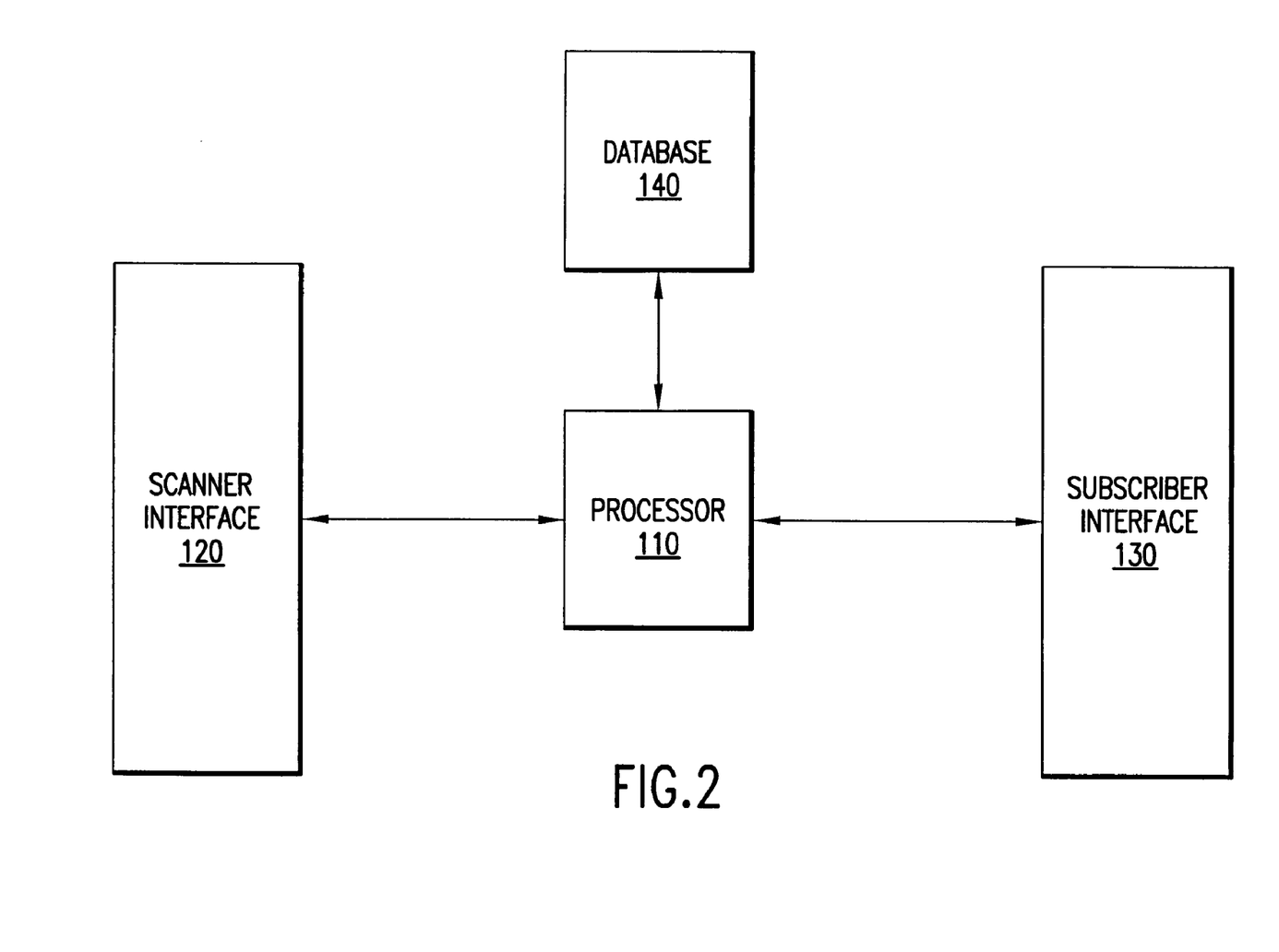
FIG. 2 is a block diagram of the portal according to the present invention.

As shown in FIG. 2, the portal includes the processor 110, which processes information and has access to the database 140 for determining the source and destination information. Processor 110 receives information from the scanners through the scanner interface 120, which is able to communicate with the individual scanners either by wireless or wired communication, and is also capable of communicating information from the processor to the scanners via the same communication networks.

The processor 110 also has a subscriber interface 130, which can interface directly with the individualized content subscribers and media subscribers, or can interface via the Internet with those subscribers. Information is sent to the subscribers via the interface 130 based upon the destination information received and processed by the processor 110. The information received from the subscribers via the subscriber interface 130 is then processed by the processor and sent to the users of the scanners based upon the source information obtained by the processor 110.

In one embodiment, the information is received at the portal from a plurality of bar code scanners. The portal determines source and destination information for the received information, and the portal distributes data from the received information to at least one destination identified by the destination information. The data can then be received from the at least one destination for communicating to a user of a bar code scanner identified by the source information. The information received from the scanner may be in batch form. Once the corresponding information from the subscriber is received and identified, the portal then sends back the responsive information to the identified bar code scanner. The information can be received at the portal in the encrypted form and be decrypted prior to distribution.

The source information can comprise device identification information. The destination information can comprise information from a scanned bar code. The portal server maintains a database of assigned bar codes. The portal assigns unique bar codes comprising destination information such as URL's, which is stored in the database. The portal can assign the unique bar codes for a given time period, so that they can be reassignable thereafter. The portal can also distribute a bar code image file for each unique bar code when the bar code is assigned. The source information and/or the destination information can be encoded in a bar code, to be read by a bar code scanner.

The portal can associate security information with each bar code scanner and require the security information from a user prior to the use of the scanner or before accepting bar code information from the scanner.

The portal can also receive time information from a plurality of bar code scanners and/or location information from a plurality of bar code scanners, particularly if the scanners are installed in cellular telephones.

In one embodiment, the source information is encoded in the device identification information. The information can be received by wireless communication and the data can be distributed to the destination over the Internet.

The portal can comprise a server having multiple processors for processing information and for determining source and destination information for the received information. The server can have one interface for receiving information from a plurality of bar code scanners and another interface for distributing data from the received information to at least one destination identified by the destination information. The two interfaces can be a single hardware input-output structure.

The server can decrypt information from the bar code scanners and distribute decrypted information received from the bar code scanners. The server also has memory for maintaining a database of assigned bar codes. The database may include one or more URL for each bar code. The memory can store an image file for each bar code and dates related to the expiration of a particular code for a particular assignee. The database can also have security information associated with each bar code scanner, and can match security information from a user prior to the use of the scanner or before accepting bar code information from the scanner.

In another embodiment, the system manages the distribution of information between a plurality of users and a plurality of content providers. The system has a plurality of bar code readers, an information exchange, a management portal and a plurality of content providers, having a content information source for distribution to select one of said plurality of users. The portal administrators could distribute bar code reading devices to each of the plurality of users, the bar code reading devices being enabled to communicate bar coded data selected by the user to the information exchange portal. The portal also distributes bar codes to at least one customer for distribution, the distributed bar codes being stored on a database, which is accessible to the information exchange portal and the database includes a corresponding information component associated with each such bar code. The portal receives decoded bar code information from at least one consumer over a network connection, and associates the customer which delivered the bar code information with the corresponding information component. The association is recorded on a information management database.

In one embodiment, a portable scanner is used to scan items, catalogs, newspaper or magazine articles, etc. The scanner stores the scanned bar codes in memory. At a later time, the bar codes stored in the scanner's memory are dumped in an encrypted or in an unencrypted form to a user's personal computer. The personal computer sends the bar codes in a batch to the portal. The portal knows what each bar code represents because it has assigned the bar codes to each thing that might be scanned.

At the time when the bar code was assigned, the assignee provides a description of the bar coded item. This description is stored in the database at the portal. When the group or batch of bar codes that a user has scanned arrives at the portal, the portal sends back the description associated with each bar code in a list or table, as a web page that can be accessed with a browser. The user looks at the list of descriptions and clicks on each one in the order that the user desires. When the user clicks on a description, several options become available. The user can purchase the item, the user can obtain a price or features for the item, the user can obtain more details about the subject of an article, the user can obtain related information about the item or an article. When the user is finished with an item, the user can delete it, save it or archive it. Then, the user can go on and click on the next item.

While the above is described with respect to bar codes that are assigned by the portal or a third party acting in conjunction with the portal, the system can also work with UPC bar codes or other bar codes, wherein an independent third party has assigned the bar codes for the purpose other than to work with the portal. In this case, the UPC bar code is read and a menu of options is returned to the user including, for example, the price, additional features, more details, related information, manufacturer, etc.

In another embodiment of the invention, the database stores web pages for each bar code on the portal server. When a bar code is read and the user is provided with the above-described options, all of the information that the user may request is stored in the portal server database. In this way, the user does not have to connect to any additional web site to obtain information about the items for which the user scanned bar codes and submitted a request to the portal.

While personal computers have been described for use with the present invention, it is understood that the system and methods described can be carried out using web appliances running web browsers that can download the necessary applets to interact with the portal server. Moreover, the web appliance in a preferred embodiment can connect only with the URL of the portal.

In a further embodiment of the present invention, the portal operator enters into a business arrangement with partners, such as manufacturers, distributors, marketers, etc. The portal partner registers for a bar code assignment, provides for a bar code assignment or provides for a mirror of the partner's look-up table of products versus UPC bar codes on the portal. The partner funds or subsidizes scanners for a particular group of customers, each of whom then scans the partner's media, so that the portal can route the request from a customer directly to the partner when the associated bar code is scanned by the user. The user first downloads a plug-in or an applet that can run with a browser. In a preferred embodiment of the present invention, there is a nominal administration fee to support the operation of the registry and the portal or gateway to the partner. If a partner's customer uses the funded device for scanning generic bar codes or the media of another party, the portal can route the user first to a portal web page with a banner advertisement and banner information relating to the partner and then to the appropriate content site. Affiliate marketing programs can also be made available on the portal.

In an alternative embodiment, wherein the portal operator has subsidized the scanning devices, the partner supplying the media will have the user routed to the partner's content through a portal web page. The partner, in a preferred embodiment, is charged on a per transaction basis for an amount that is predetermined between the portal and the partner. The user first downloads a plug-in or an applet that can be run with the browser. When the user scans someone else's media and requests information, the user may be routed through the portal web page to the affiliated marketing programs that can provide information or be available to the user, before the user is transferred to the content of the third party.

In this embodiment, the partner also registers for a bar code assignment or provides a mirror of the partner's database for UPC symbols and the like in the portal database.

In a preferred embodiment of the present invention, the portal server uploads a device ID and matches the device ID to a sponsor or merchant, if applicable, requests a password from a user, and authenticates the password to the device ID. The portal can generate advertisements based on a customer profile at that time and present these advertisements to the user on the web site.

The portal server reads the data, decrypts data and converts the data to UPC information or the like, and matches the UPC information to the database of a sponsor merchant, if applicable. It can identify unknown items by searching a UPC translator to identify and match product description of unknown items. It can also isolate keyword product descriptions and/or feed the keyword into a sponsor merchant's search engine. The server can also match the keyword to an advertiser database and post applicable banner adds or offers to the user.

The server may then list product descriptions for conforming products, and alternatively for non-conforming products, with a merchant's alternative offerings. The server may allow for edits, and may request the user to send an immediate order for the bar coded item transmitted by the user. The server will then update a customer profile database for each customer.

Figure 3:
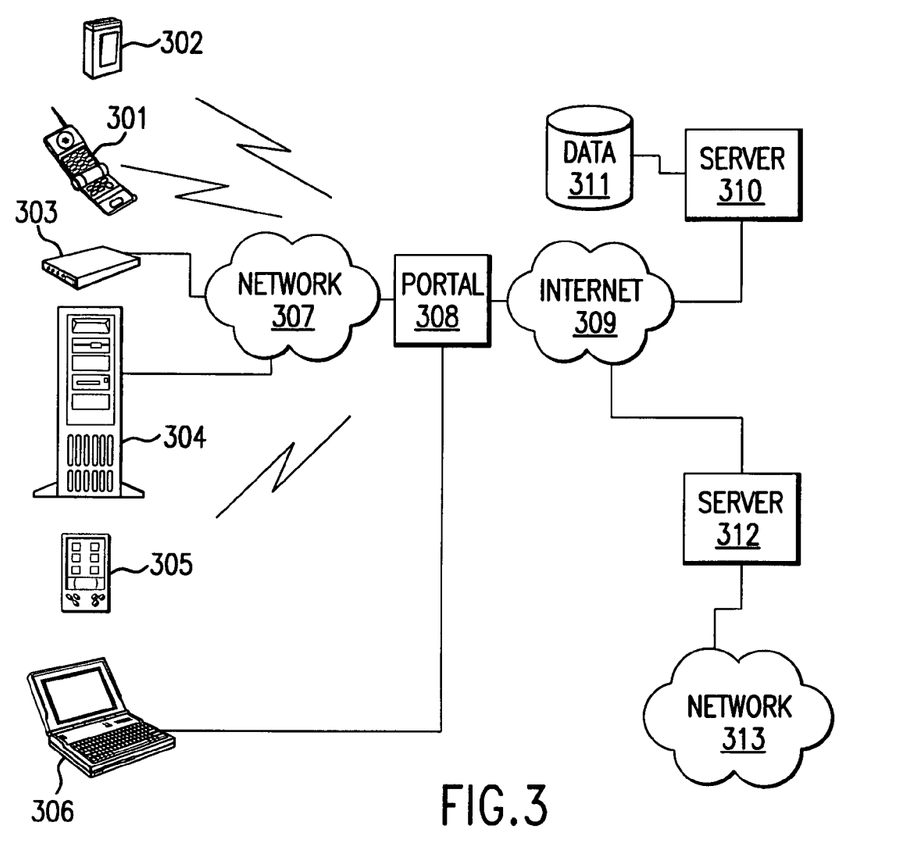
FIG. 3 is a schematic of the system for carrying out the methods of the present invention.

Referring to FIG. 3, a system for using web codes contemplates that the web codes can be read by any conventional barcode reader, such as a wand reader, a laser scanner, a CCD reader or the like, and provide access to an Internet network 309. The preferred reader is a cell phone 301 with a scanner that can transmit the web code to a web portal 308. The portal can be reached directly via a wireless transceiver on PDA 305 or via a wired connection from laptop 306. Alternatively, the portal can be reached indirectly through network 307 which can be an intranet or other network. A desktop computer 304 can be wired to network 307, a PC card connected to a computer can provide a wired or wireless link to the network or the cell phone 301 or PDA 302 can be wirelessly linked to network 307. All of the devices 301-306 have bar code readers integrated into the devices or connected thereto for reading web codes. The applications for the web codes are carried out in wireless LAN environments that have Internet connectivity.

Server 310 connected to database 311 services the data sent to the portal and returns information as desired. Server 312 can work with or instead of server 310 by accessing data from a network 313 which can be an intranet or other network.

Figure 4:
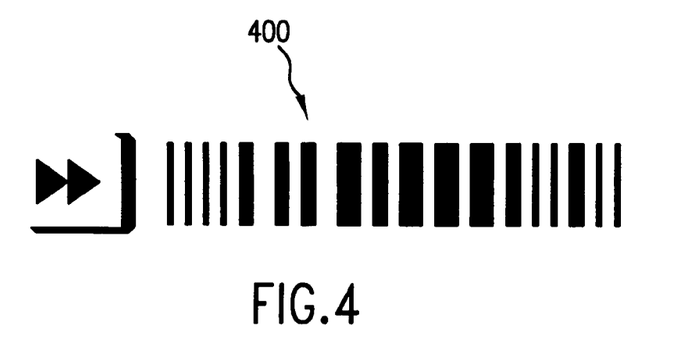
FIG. 4 is an example of a web code.

FIG. 4 illustrates one embodiment of a web code 400 for use with the invention. Details relating to the structure of the code are disclosed in pending application Nos. 60/239,678 and 60/237,639, the contents of which are hereby incorporated by reference.

Figure 6:
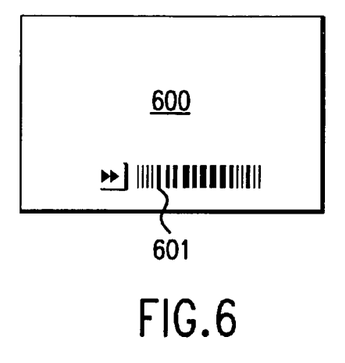

In one embodiment, shown in FIG. 6, a web code 601 is scanned on a lottery ticket 600 and the user can then obtain an immediate response from a website telling the user whether he or she has won or lost. Alternatively, one can scan the barcode on a lottery ticket and obtain extended gaming, wherein certain lottery activities would take place so that there is time before the outcome is delivered to the user.

Figure 5:
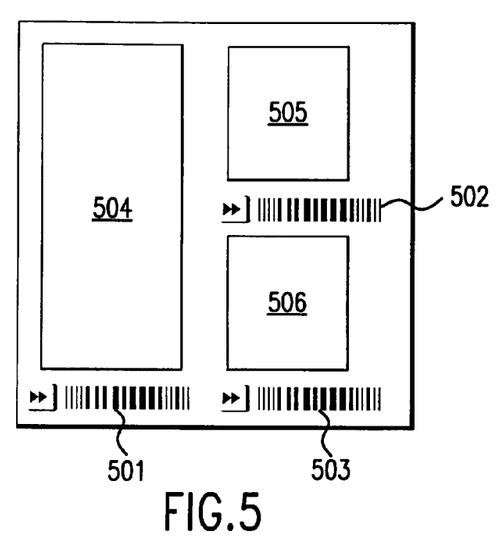
FIGS. 5-9 are examples of uses of a web code in accordance with the invention.

In another embodiment shown in FIG. 5, the web codes 501-503 are associated with articles and pictures 504-506 and wireless scanner cellular phones are used with newspapers, and in particular, certain sections of the newspaper.

One can use it with the chess section, wherein you scan the web code, it connects you to a site where you then can either have a chess program downloaded to your computer or you can play a chess game on the computer with someone or a machine at the website. Alternatively, you could play out the game that is being highlighted in the chess section of the newspaper.

Similarly, one could have a web code in the bridge section of the newspaper. Scanning the code would allow you to play out the game as reported on your machine and perhaps have other interface relating to the bidding of the hand, etc.

One could scan web code listings in the newspapers relating to different athletes or allow you to scan a web code on baseball cards to get the immediate player stats for fantasy baseball or the like.

One could also scan the web code next to a sports picture and get the video clip of that picture. This could be done with any picture in a newspaper, even outside the sport section, to get a video clip.

The web code can be used with cartoons or comics. The user scans the web code in the phone and gets more of the cartoon. One could scan the web code next to a joke and get the punch line, or one could scan the web code near a trivia question and get an answer.

Web codes can also be used with classified ads. A web code next to a real estate classified ad could allow the user to obtain a virtual tour or inspection of the property offered for sale.

One could scan advertisements for magazines, scan the web code and obtain a sample of the magazine, such as one story or pictures from the magazine.

Web codes in newspapers can be used to allow the user to determine delivery dates or stop dates for delivery of the newspaper. A newspaper can have web codes that, if scanned by a user, would allow the user to buy a lottery ticket and have the cost of the ticket deducted from the user's account, such as charging it to a cell phone bill.

In another embodiment, one could update one's checkbook by scanning a web code on a receipt, so that it can deduct it from the checkbook in one's checking account program on the Internet.

Another use for the web code includes putting a web code on a wall to view graffiti or art.

One can have a web code associated with a magazine article, and one can scan the web code and hear the article reproduced by audio. Alternatively, one can scan a web code on associated media and obtain a different multimedia version of the associated media. Thus, for example, a video instead of a static graphic, video versus audio, print versus audio, print versus video, one language versus a different language. One could associate a web code associated with any print material to get a picture relating to that print or text. One could scan a web code with a movie ad and get the trailer. One could scan a web code with an advertisement for a book and get the first chapter. Web codes could be associated with textbooks, so that scanning the web code at the end of a chapter will obtain answers to questions and scanning a web code could also obtain explanations of the answers.

Web codes can be provided for security guards for obtaining information relating to buildings or other facilities being watched.

The method and system of the present invention allows for real time responses, so that one could submit the answer to a question or series of questions using web codes associated with those questions, and one could obtain the status of your score relative to others who are answering the same questions.

Web codes could be used with newspapers or other print media to allow readers to play "So You Want To Be A Millionaire". They could scan a web code and present an answer within a given time period, for example, one minute.

Another embodiment is the use of web codes with products, and the web code can be scanned to obtain an instruction manual for the product. Alternatively, the code can be scanned to get warranty registration or warranty information. A web code can be used for the remote control of a VCR.

Figure 7:
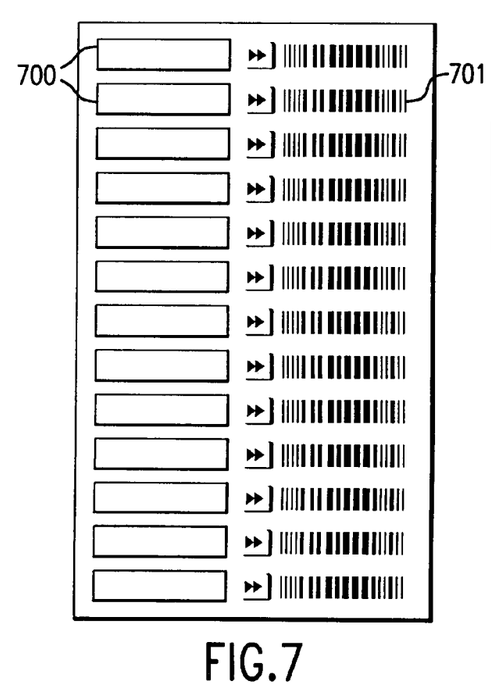

Web codes can be used to order food from a menu in a restaurant as shown in FIG. 7. One could scan one of codes 701 associated with menu items 700 and it would explain what the dish is, it could show a picture of the dish, or one can order by scanning the item on the menu and scanning a code corresponding to the table. A WAN to WAN connectivity can be used so that no infrastructure is needed in the restaurant. One could also scan a discount card and the bill from the restaurant, so one could obtain a discount on the meal from the club or whatever group the user belongs to. One can also scan a menu for food delivery.

With regard to a restaurant, one could scan web codes to preload an order and to indicate when one would come back to pick it up. The user could also load in coupons by scanning them, so that the final bill would take into account the coupons.

Figure 8:
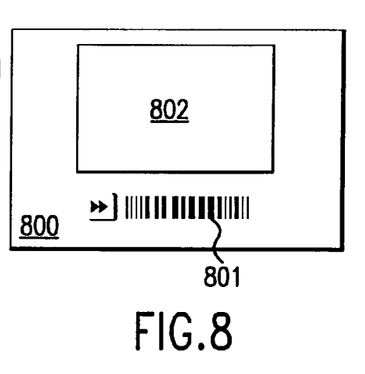

The placing of a web code 801 on a business card 800, as shown in FIG. 8, could be used to indicate directions via GPS to the destination indicated on the business card in 802. Moreover, verbal directions could be given, particularly in view of the fact that the scanner's position would be known. This would use GPS along with the scanner and the cell phone.

The business card web code could also be used to indicate to the person scanning the types of transportation available at the address, the hotels at the address, restaurants, etc.

In a further embodiment, one can link personal data with the scanner, so that information retrieved based on the scanning of a web code would be based on the personal information. This could either be device specific personal information or user specific personal information. For example, one can use a web code on a police sticker or a fire sticker that one puts in one's home. Scanning the web code on the stickers would enable the homeowner to get connected, and the homeowner's address and telephone number and other important information, for example, the nearness of a hydrant or other personal information, would be indicated.

One could also have an emergency sticker with a web code in the car. Scanning this web code would dial 911 and give the police the name and identity of the car and car owner and perhaps the location of the car.

In another embodiment, one can use a precode on the web code which would be tied to what the code should be used for. For example, one precode would indicate that the code is a telephone number which would be programmed to have the phone call the number and send information. Preferably, the reader would have a preprocessor to handle this precode.

In the situation where the output of the scanner is encrypted and must go to a website, a particular prefix on a web code can be used to turn off the encryption, so that it would be indicating to the device that this code is intended to be read locally.

The web codes can be used with all manners of materials. Voting materials would have web codes, so that the user could scan the code and find out information about the candidate and perhaps the be directed to the candidate's website.

A web code on a map would be used to obtain a different version that is dynamically changed for a user. For example, depending upon the time of day, day of the week, or depending upon real time information, such as an accident or a road closure for other reasons, the map would dynamically change and give a alternate route to the user based upon the real time information.

A commuter time table with web codes to enable the user to scan the time table and find out real time information about the train, such as whether it is on time, the track and perhaps other trains that leave before and after it.

Web codes could also be scanned for parking situations. One could have a parking sign with the web code, which when scanned, would tell you the regulations regarding parking for that particular day, the rate of parking and any other special information which is up to the minute, such as cancellation of alternate side of the street parking, etc. Scanning the barcode and perhaps scanning a car code would enable the cost of the parking to be charged to the user's cell phone account.

In another example, a parking area has web codes to be scanned at the time of entry, and one is informed of the parking spot that one has been assigned and for the time period for which one can park there. Moreover, the charges for parking for that time period will be billed to one's cell phone account.

In a further example, one could scan a web code on the seat that one is sitting in at a sporting event or a theater and scan web codes on a menu and have a person come with the food to one's seat when the food is ready.

Web codes could also be used for window shopping. One would scan the code in the window and get information about the product.

A further use of web codes is with airline tickets. For example, an American Airlines ticket would have a web code on it which the user could scan to find out if the flight is on time and any other real time information regarding the flight. One could also find out the seating assignment, the size of the plane, and any other up to date information.

Regarding airline tickets and other activities requiring a waiting list, one could have an update as to where one is on a waiting list by scanning a web code on a receipt.

The scanning of web codes by a cell phone scanner thereby provides a user with real time updates in almost any situation.

In another embodiment, two items, each having a web code, could be scanned so that the items are matched.

In a further embodiment web codes are used on coupons. A person could receive a coupon at home for Burger King or McDonald's. The person would then go to the restaurant, scan the code, and the restaurant could then check the customer's profile and suggest a menu based upon prior shopping behavior.

Web codes can also be used for completing transactions. A web code is placed on the scanning device cell phone itself. One could then scan a web code for a particular product, for example, at a retailer, and then the retailer would scan the web code on the user's device which would include credit card information and any other personal information need to complete the transaction.

Another example is to have web codes on clothes. In this way, if one went to a retailer, the retailer could scan the web codes on one's clothes and look up in a database relating to the customer what other clothes he has or what his preferences are for colors and be able to match to the clothes that he has or to fill in what he doesn't have.

Figure 9:
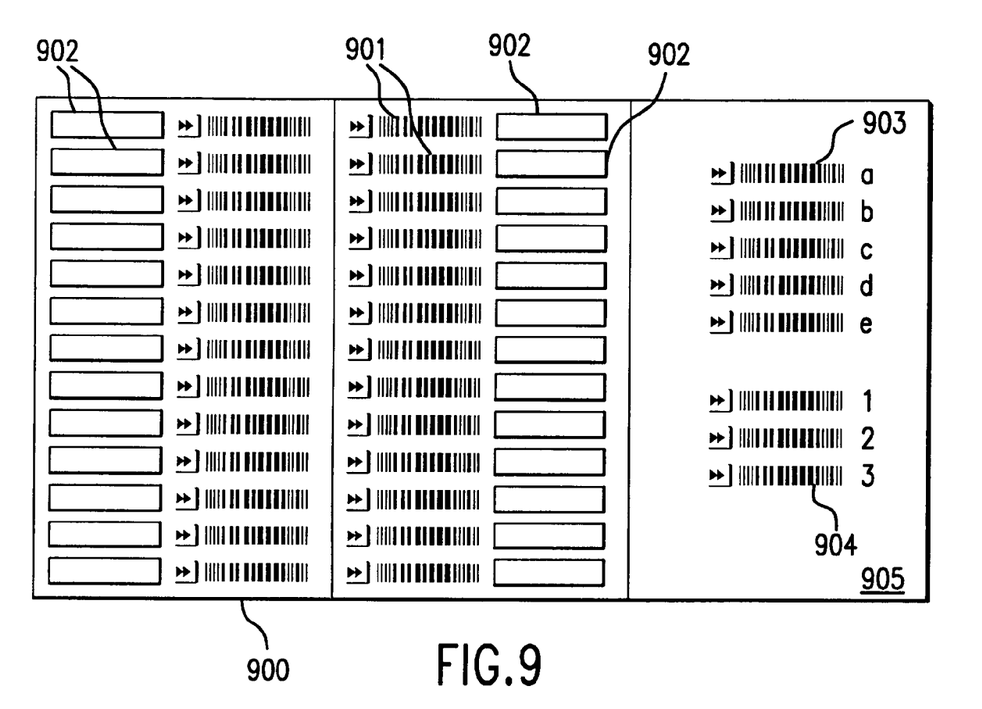

In a further embodiment, as shown in FIG. 9, web codes can be used for catalog ordering. A catalog 900 would have a web code 901 for each item 902 and a set of secondary bar codes or web codes 903, 904 for color, size, style, etc. The secondary codes would be either on the back page of the catalog or on a foldout page 905 which can be accessed when the user is on any page of the catalog. The method would preferably require that the cell phone scanner indicate to the user that it needs more information than the originally scanned web code for the item. This can be done by beeping and having some text prompt that asks for one to scan the next barcode in order to input color, size, etc. Alternatively, LED's, LCD's or some other kind of display would prompt the user to scan more barcodes.

For example, for color, the display would prompt one to scan "a" for red, "b" for white, "c" for black, etc. There would be a generic scan code 903 for a, b, c, d and e. For an other item, it may say scan "a" for brown and "b" for blue. Thus, it would be the combination of the scanning of the first code and the scanning of the second code that would define the specific information for each item. One would only need to provide a, b, c, d, e scan codes 903 and/or 1, 2, 3 scan codes 904, so as to be able to batch load all of the information needed for any particular item, and this would cut down on the number of codes necessary for each catalog entry. The system could also be used to give one up to date information as to whether the item one is ordering is in stock or if it is on backorder. Moreover, the personal information that can be sent to the catalog retailer might be able to lookup the information about the customer in a database to see whether the customer should get a discount on the items or one free item for being a good customer, or perhaps a prize for being a good customer. The system could also anticipate sizes, colors, etc. for the customer to cut down on the amount of information that the customer has to enter.

The web codes could also be used with the return process. A package would arrive with a web code for the package which would be scanned to return an item. The scanning of that web code could instruct UPS to pick the parcel up at the house of the device user. The device user could also select a time, and date, or may scan a code to request that a new or different size article be sent in place of the one being returned. The system could also do a real time authorization, that is, to make sure that the item is being returned within the proper time for obtaining a refund, or if it is outside that time, only for a store credit.

The invention uses a web code and a cell phone scanner combination to put an updated real time consumer oriented database at the disposal of the user.

Web codes can also be used for encoding a telephone number, and the reader needs to know if the web code contains a URL or a telephone number. In one embodiment, an intermediate step relating to privacy and/or security, for example, is provided, asking the user if he or she really wants to dial this telephone number. As an added security measure, one would scan a PDF bar code on a card to identify the user before dialing the telephone number or going to a particular URL. Alternatively, a fingerprint reader can be provided in a scan button or one could use other biometrics for security purposes, for example, voice recognition or retina scan when the scan appliance includes a cellular phone.

The system could also be used to notify parents in real-time of credit card use by children and request approval. The system could also provide a profile of use to obtain pre-approval.

In another embodiment, a registry of applets can be provided on the web and web codes would be used to call out the desired applet.

Web codes can also be used with trial versions of products, such as music, video, games, toys, books, etc. In accordance with this embodiment, one would scan a web code in order to obtain a trial sample of the product and if the user liked the sample, one could scan another web code to buy the rest of it.

Another use of web codes is for multiple groups collaborating. One could scan a web code to arrange a preassigned meeting, for example, the web code to take one to a particular web page and provide one with an entry code to collaborate on that web page with others in the group.

One could sell blocks of web codes to retailers to use on receipts in order to take them or the purchaser to a database to find out information about the last purchase. Alternatively, one could provide incentives for people to purchase products that they put into their "cart", but they don't actually buy. The system would then offer discounts, etc., when someone took the product out of their cart. One can assign a predetermined range of web codes for parental control, and the control can be in the code or in the server. If in the code, then certain prefixes, etc., would be blocked, or the server would have a database of blocked codes.

Also for group meetings, one could use the web code to take potential meeting participant to a URL with the agenda. Alternatively, one could scan a code for a meeting, then scan another code for the time of the meeting, and then scan another code that directed it to a particular group of participants.

A web code could be on a business card to take one to a public calendar on a portal such as Yahoo.

The reader could also cache the last web code scanned or scan a code to save a particular web code number, i.e., by adding it to a favorites list or bookmarking it. A web code could be used to synchronize a PDA to a desktop, for example, for AvantGo.

A PDA could also be used to beam a web code. A web code could be used to send data to what is commonly known as web drives or side loading information into such a web drive. Then a web code could be scanned to synchronize the web drive to the hard drive of a computer.

One can also cross-sell web codes, that is, when a portal or website provider sets up a website for a user, the user automatically gets a web code to put on one's business card. This would be value added for the ISP. One could also put the web code on stationary, etc.

A web code can also be used to provide a profile and concatenate this to a warranty input. One could synch to the profile of choice. One would scan a bar code and send a profile to a person based on the scanning of a web code as the receiving address. One could selectively opt in by sending a profile by using a web code as an enabling code or one code associated with a group of websites. This is called "dynamically opting in" by reading a web code.

It is understood that in addition to the use of web codes, one can put this information on using magnetic stripes which encode the web code information. Alternatively, voice inputs into a phone using voice recognition for certification and the encryption of phone signals can be used to talk in a web code. One could also use the keypad to input the web code information.

What is claimed is:

1. A method for processing information, comprising:
   a) maintaining a database of bar codes and destination information associated with the bar codes, the database being accessible by a remote device;
   b) receiving information, at the remote device, from a plurality of bar code scanners, the received information from each bar code scanner including bar code information and source information identifying a user of the bar code scanners;
   c) identifying at least a portion of the destination information stored in the database based on at least a portion of the received bar code information, said portion of the received bar code information comprising data relating to a type of destination information;
   d) using said type of destination information for accessing from the remote device data stored at a network location referenced by the identified portion of the destination information; and
   e) providing the data accessed by the remote device from the network location to at least one user of at least one of the bar code scanner based on the received source information.

2. The method according to claim 1, further comprising:
   determining whether the information received from the bar code scanners being in an encrypted form; and
   if so, decrypting the received information.

3. The method according to claim 1, wherein receiving the information from the bar code scanners comprises receiving user identification information associated with the bar code scanners.

4. The method according to claim 1, wherein receiving the information comprising:
   receiving a portion of the destination information associated with the bar code information.

5. The method according to claim 1, further comprising:
   disassociating the bar codes with the destination information associated with those bar codes.

6. The method according to claim 1, further comprising associating a bar code image file with one or more of the bar codes.

7. The method according to claim 1, further comprising associating security information with one or more of the bar code scanners before allowing use of the one or more scanners.

8. The method according to claim 1, further comprising receiving time information from one or more of the bar code scanners.

9. The method according to claim 1, further comprising receiving location information from one or more of the bar code scanners.

10. The method according to claim 1, wherein the information received by the remote device wirelessly.

11. The method according to claim 2, wherein the network location is an Internet location.

12. A portal for processing information, comprising:
    a) a first interface for receiving information from a plurality of bar code scanners, the received information from each bar code scanner including bar code information; and
    b) a processor for:
    identifying at least a portion of the destination information stored in a database based on at least a portion of the received bar code information, wherein said portion of the received bar code information comprising data relating to a type of destination information and the database includes destination information associated with one or more bar codes and the database being accessible by the processor,
    using said type of destination information for accessing a network location referenced by the identified portion of the destination information, and providing data received from the network location to users of the bar code scanners.

13. The portal according to claim 12, the information received from the bar code scanners being in an encrypted form, wherein the processor decrypts the received information.

14. The portal according to claim 12, wherein the processor receives identification information associated with the bar code scanners.

15. The portal according to claim 12, wherein the received information comprises a portion of the destination information associated with the bar codes.

16. The portal according to claim 12, wherein the bar codes are disassociated with the destination information associated with those bar codes.

17. The portal according to claim 12, wherein the processor associates a bar code image file with one or more of the bar codes.

18. The portal according to claim 12, wherein the processor associates security information with one or more of the bar code scanners before allowing use of the one or more bar code scanners.

19. The portal according to claim 12, wherein the first interface receives time information from one or more of the bar code scanners.

20. The portal according to claim 12, wherein the first interface receives location information from one or more of the bar code scanners.

21. The portal according to claim 12, wherein the first interface receives the information wirelessly.

22. The portal according to claim 12, wherein the network location is an Internet location.

23. The portal according to claim 12, wherein accessing a network location referenced by the identified portion of the destination information further comprises:
    accessing a first or a second network location type referenced by the identified portion of the destination information based on whether the information received from the bar code scanners is encrypted.

24. The portal according to claim 12, wherein providing data received from the network location to users of the bar code scanners further comprises:
    providing data received from a first or a second network type location, wherein the first network type location is a telephone number and the second network type location is an Internet portal address.

25. A method for using a bar code encoded with information corresponding to an externally assigned entity, the bar code having an associated prefix portion, where the prefix portion indicates whether to deactivate encryption, the method comprising:

receiving information represented in the prefix portion of the bar code;
connecting a user to the entity based on information represented in the bar code and based on the information represented in the prefix portion; and
receiving information from the entity.

26. The method according to claim 25, further comprises:
associating a precode with the bar code to indicate that the bar code is encoded with a telephone number, where the telephone number is associated with the entity.

27. The method according to claim 25, wherein receiving the information represented by the prefix portion further comprises a bar code scanner receiving the information represented in the prefix portion.

28. The method according to claim 27, further comprising:
displaying at least a portion of the information represented in the bar code on a local display associated with the bar code scanner based on the prefix portion indicating that encryption be deactivated.

29. The method according to claim 27, further comprising:
associating a precode with the bar code, where the precode indicates that the bar code is a telephone number, where the telephone number is associated with the entity.

30. A method, comprising:
receiving bar codes information and source information, at a remote device, from a plurality of bar code readers, the bar codes selected by a group of users using the plurality of bar code readers from a plurality of sources, the source information identifying a user in the group, a portion of the received bar codes comprising data relating to a type of destination information;
using said type of destination information for accessing a network location referenced by destination information accessible by the remote device;
allowing the group of users to connect to the network location in response to receiving the bar codes based on the source information; and
permitting the group of users to communicate with each other through a common web page based on information encoded in each bar code and based on destination information corresponding to the received bar codes, wherein the destination information is accessible from the network location.

31. The method according to claim 30, wherein allowing the group of users to connect, further comprises:
allowing at least one user to connect to the network location when encryption of bar code information is not indicated and not allowing the user to connect to the network location when encryption of the bar code information is indicated.

32. The method according to claim 31, wherein allowing said at least one user to connect further comprises:
connecting said at least one user to one of a telephone number and the network location depending upon whether the encryption of the bar code information is turned off.

33. The method according to claim 32, further comprises:
providing data received from the network location to said at least one user of at least one of the bar code readers on the received source information.

34. A method for processing information from a bar code, where the bar code has an associated prefix portion that indicates whether to deactivate encryption, comprising:
receiving, at a device, bar code information and information represented by the prefix portion; and
based on the information represented by the prefix portion, displaying at least a portion of the bar code information on a display associated with the device or connecting the device to a remote location indicated in the bar code information.

35. The method according to claim 34, wherein receiving the information represented by the prefix portion further comprises a bar code scanner receiving the information represented in the prefix portion.

36. The method according to claim 35, further comprising:
displaying at least a portion of the information represented in the bar code on a local display associated with the bar code scanner based on the prefix portion indicating that encryption be deactivated.

37. The method according to claim 35, further comprising:
associating a precode with the bar code, where the precode indicates that the bar code is a telephone number, where the telephone number is associated with the entity.

* * * * *